US006247174B1

(12) United States Patent
Santhanam et al.

(10) Patent No.: US 6,247,174 B1
(45) Date of Patent: Jun. 12, 2001

(54) OPTIMIZATION OF SOURCE CODE WITH EMBEDDED MACHINE INSTRUCTIONS

(75) Inventors: Vatsa Santhanam; David Gross, both of Campbell; John Kwan, Foster City, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/002,420

(22) Filed: Jan. 2, 1998

(51) Int. Cl.$^7$ .................................................. G06F 9/45
(52) U.S. Cl. ................................................ 717/9; 717/7
(58) Field of Search ............................ 395/704, 707, 395/709; 717/7, 9

(56) References Cited

U.S. PATENT DOCUMENTS

| 5,175,856 | * | 12/1992 | Van Dyke et al. | 717/4 |
|---|---|---|---|---|
| 5,230,050 | * | 7/1993 | Litsuka et al. | 717/7 |
| 5,339,419 | * | 8/1994 | Chan et al. | 717/7 |
| 5,396,631 | * | 3/1995 | Hayashi et al. | 717/7 |
| 5,493,675 | * | 2/1996 | Faiman, Jr. et al. | 717/9 |
| 5,555,417 | * | 9/1996 | Odnert et al. | 717/7 |
| 5,557,761 | * | 9/1996 | Chan et al. | 717/9 |
| 5,704,053 | * | 12/1997 | Samthanam | 284/383 |
| 5,752,037 | * | 5/1998 | Gornish et al. | 395/709 |
| 5,797,013 | * | 8/1998 | Mahadevan et al. | 395/709 |
| 5,845,126 | * | 12/1998 | Ju et al. | 395/708 |
| 5,854,934 | * | 12/1998 | Hsu et al. | 395/709 |
| 5,933,643 | * | 8/1999 | Holler | 395/709 |

OTHER PUBLICATIONS

Borland International Inc.; Borland C++ User's Guide: Version 4.0. Borland International Inc, Scotts Valley, CA, chapter 3, Aug. 1993.*

Borland International Inc.; Borland C++ Programmer's Guide: Version 4.5. Borland International Inc, Scotts Valley, CA, chapters 2, 5 and 8, May 1994.*

Cygnus Corporation, "Using GNU CC: Assembler Instructions with C Expression Operands", Cygnus Corporate Website (www.cygnus.com), Aug. 1992.*

"Assembler Instructions with C Expression Operands," (Oct. 5, 1997) located at website: www.cygnus.com/pubs/gnupro/2; and "Asm Labels" (Mar. 19, 1996) located at website: euch6h.chem.emory.edu/services/gcc/html/Asm—specification notes accompanying releases of the Gnu C compiler; Cygnus Solutions, Inc.

Intel C/C++ and Fortran Compilers; white paper—copyright 1997, Intel Corporation.

* cited by examiner

Primary Examiner—James P. Trammell
Assistant Examiner—Kelvin E. Booker

(57) ABSTRACT

A software mechanism for enabling a programmer to embed selected machine instructions into program source code in a convenient fashion, and optionally restricting the re-ordering of such instructions by the compiler without making any significant modifications to the compiler processing. Using a table-driven approach, the mechanism parses the embedded machine instruction constructs and verifies syntax and semantic correctness. The mechanism then translates the constructs into low-level compiler internal representations that may be integrated into other compiler code with minimal compiler changes. When also supported by a robust underlying inter-module optimization framework, library routines containing embedded machine instructions according to the present invention can be inlined into applications. When those applications invoke such library routines, the present invention enables the routines to be optimized more effectively, thereby improving run-time application performance. A mechanism is also disclosed using a "__fpreg" data type to enable floating-point arithmetic to be programmed from a source level where the programmer gains access to the full width of the floating-point register representation of the underlying processor.

56 Claims, 3 Drawing Sheets

OPTIMIZATION OF SOURCE CODE WITH EMBEDDED MACHINE INSTRUCTIONS

TECHNICAL FIELD OF THE INVENTION

This invention relates generally to the compilation of computer code performing floating-point arithmetic operations on floating-point registers, and more particularly to enabling, via a new data type, access in source code to the full width of the floating point register representation in the underlying processor.

BACKGROUND OF THE INVENTION

Source-level languages like C and C++ typically do not support constructs that enable access to low-level machine-instructions. Yet many instruction set architectures provide functionally useful machine instructions that cannot readily be accessed from standard source-level constructs.

Typically, programmers, and notably operating system developers, access the functionality afforded by these special (possibly privileged) machine-instructions from source programs by invoking subroutines coded in assembly language, where the machine instructions can be directly specified. This approach suffers from a significant performance drawback in that the overhead of a procedure call/return sequence must be incurred in order to execute the special machine instruction(s). Moreover, the assembly-coded machine instruction sequence cannot be optimized along with the invoking routine.

To overcome the performance limitation with the assembly routine invocation strategy, compilers known in the art, such as the Gnu C compiler ("gcc"), provide some rudimentary high-level language extensions to allow programmers to embed a restricted set of machine instructions directly into their source code. In fact, the 1990 American National Standard for Information Systems—Programming Language C (hereinafter referred to as the "ANSI Standard") recommends the "asm" keyword as a common extension (though not part of the standard) for embedding machine instructions into source code. The ANSI Standard specifies no details, however, with regard to how this keyword is to be used.

Current schemes that employ this strategy have drawbacks. For instance, gcc employs an arcane specification syntax. Moreover, the gcc optimizer does not have an innate knowledge of the semantics of embedded machine instructions and so the user is required to spell out the optimization restrictions. No semantics checks are performed by the compiler on the embedded instructions and for the most part they are simply "passed through" the compiler and written out to the target assembly file.

Other drawbacks of the inline assembly support in current compilers include:

(a) lack of functionality to allow the user to specify scheduling restrictions associated with embedded machine instructions. This functionality would be particularly advantageous with respect to privileged instructions.

(b) imposition of arbitrary restrictions on the kind of operands that may be specified for the embedded machine instructions, for example:
the compiler may require operands to be simple program variables (where permitting an arbitrary arithmetic expression as an operand would be more advantageous); and
the operands may be unable to refer to machine-specific resources in a syntactically natural manner.

(c) lack of functionality to allow the programmer to access the full range and precision of internal floating-point register representations when embedding floating-point instructions. This functionality would simplify high-precision or high-performance floating-point algorithms.

(d) imposition of restrictions on the ability to inline library procedures that include embedded machine instructions into contexts where such procedures are invoked, thereby curtailing program optimization effectiveness.

In addition, when only a selected subset of the machine opcodes are permitted to be embedded into user programs, it may be cumbersome in current compilers to extend the embedded assembly support for other machine opcodes. In particular, this may require careful modifications to many portions of the compiler source code. An extensible mechanism capable of extending embedded assembly support to other machine opcodes would reduce the number and complexity of source code modifications required.

It would therefore be highly advantageous to develop a compiler with a sophisticated capability for processing machine instructions embedded in high level source code. A "natural" specification syntax would be user friendly, while independent front-end validation would reduce the potential for many programmer errors. Further, it would be advantageous to implement an extensible compiler mechanism that processes source code containing embedded machine instructions where the mechanism is smoothly receptive to programmer-defined parameters indicating the nature and extent of compiler optimization permitted in a given case. A particularly useful application of such an improved compiler would be in coding machine-dependent "library" functions which would otherwise need to be largely written in assembly language and would therefore not be subject to effective compiler optimization, such as inlining.

In summary, there is a need for a compiler mechanism that allows machine instructions to be included in high-level program source code, where the translation and compiler optimization of such instructions offers the following advantageous features to overcome the above-described shortcomings of the current art:

a) a "natural" specification syntax for embedding low-level hardware machine instructions into high-level computer program source code.

b) a mechanism for the compiler front-end to perform syntax and semantic checks on the constructs used to embed machine instructions into program source code in an extensible and uniform manner, that is independent of the specific embedded machine instructions.

c) an extensible mechanism that minimizes the changes required in the compiler to support additional machine instructions.

d) a mechanism for the programmer to indicate the degree of instruction scheduling freedom that may be assumed by the compiler when optimizing high-level programs containing certain types of embedded machine instructions.

e) a mechanism to "inline" library functions containing embedded machine instructions into programs that invoke such library functions, in order to improve the run-time performance of such library function invocations, thereby optimizing overall program execution performance.

Such features would gain yet further advantage and utility in an environment where inline assembly support could gain access to the full width of the floating point registers in the target processor via specification of a corresponding data type in source code.

SUMMARY OF THE INVENTION

These and other objects and features are achieved by one embodiment of the present invention which comprises the following:

1. A general syntax for embedding or "inlining" machine (assembly) instructions into source code. For each machine instruction that is a candidate for source-level inlining, an "intrinsic" (built-in subroutine) is defined. A function prototype is specified for each such intrinsic with enumerated data types used for instruction completers. The function prototype is of the following general form:

opcode_result=_Asm_opcode (opcode_argument_list [,serialization_constraint_specifier])

where _Asm_opcode is the name of the intrinsic function (with the "opcode" portion of the name replaced with the opcode mnemonic). Opcode completers, immediate source operands, and register source operands are specified as arguments to the intrinsic and the register target operand (if applicable) corresponds to the "return value" of the intrinsic.

The data types for register operands are defined to match the requirements of the machine instruction, with the compiler performing the necessary data type conversions on the source arguments and the return value of the "inline-assembly" intrinsics, in much the same way as for any user-defined prototyped function.

Thus, the specification syntax for embedding machine instructions in source code is quite "natural" in that it is very similar to the syntax used for an ordinary function call in most high-level languages (e.g. C, C++) and is subject to data type conversion rules applicable to ordinary function calls.

Further, the list of arguments for the machine opcode is followed by an optional instruction serialization_constraint_specifier. This feature provides the programmer a mechanism to restrict, through a parameter specified in source code, compiler optimization phases from re-ordering instructions across an embedded machine instruction.

This feature is highly advantageous in situations where embedded machine instructions may have implicit side-effects, needing to be honored as scheduling constraints by the compiler only in certain contexts known to the user. This ability to control optimizations is particularly useful for operating system programmers who have a need to embed privileged low-level "system" instructions into their source code.

Serialization_constraint_specifiers are predefined into several disparate categories. In application, the serialization_constraint_specifier associated with an embedded machine instruction is encoded as a bit-mask that specifies whether distinct categories of instructions may be re-ordered relative to the embedded machine instruction to dynamically execute either before or after that embedded machine instruction. The serialization constraint specifier is specified as an optional final argument to selected inline assembly intrinsics for which user-specified optimization control is desired. When this argument is omitted, a suitably conservative default value is assumed by the compiler.

2. A mechanism to translate the source-level inline assembly intrinsics from the source-code into a representation understood by the compiler back-end in a manner that is independent of the specific characteristics of the machine instruction being inlined.

The inline assembly intrinsics are "lowered" by the compiler front end into a built-in function-call understood by the code generation phase of the compiler. The code generator in turn expands the intrinsic into the corresponding machine instruction which is then subjected to low-level optimization.

An automated table-driven approach is used to facilitate both syntax and semantic checking of the inline assembly intrinsics as well as the translation of the intrinsics into actual machine instructions. The table contains one entry for each intrinsic, with the entry describing characteristics of that intrinsic, such as its name and the name and data types of the required opcode arguments and return value (if any), as well as other information relevant to translating the intrinsic into a low-level machine instruction.

The table is used to generate (1) a file that documents the intrinsics for user programmers (including their function prototypes) (2) a set of routines invoked by the compiler front-end to parse the supported inline assembly intrinsics and (3) a portion of the compiler back-end that translates the built-in function-call corresponding to each intrinsic into the appropriate machine instruction.

This table-driven approach requires very few, if any, changes to the compiler when extending source-level inline assembly capabilities to support the embedding of additional machine instructions. It is usually sufficient just to add a description of the new machine instructions to the table, re-generate the derived files, and re-build the compiler, so long as the low-level components of the compiler support the emission of the new machine instructions.

3. Where supported by a cross-module compiler optimization framework, a mechanism to capture the intermediate representation into a persistent format enables cross-module optimization of source-code containing embedded machine instructions. In particular, library routines with embedded machine instructions can themselves be "inlined" into the calling user functions, enabling more effective, context-sensitive optimization of such library routines, resulting in improved run-time performance of applications that invoke the library routines. This feature is highly advantageous, for instance, in the case of math library routines that typically need to manipulate aspects of the floating-point run-time environment through special machine instructions.

The inventive machine instruction inlining mechanism is also advantageously used in conjunction with a new data type which enables programmatic access to the widest mode floating-point arithmetic supported by the processor. As noted in the previous section, inline support in current compilers is generally unable to access the full range and precision of internal floating-point register representations when embedding floating-point instructions. Compiler implementations typically map source-level floating-point data types to fixed-width memory representations. The memory width determines the range and degree of precision to which real numbers can be represented. So, for example, an 8-byte floating-point value can represent a larger range of real numbers with greater precision than a corresponding 4-byte floating-point value. On some processors, however, floating-point registers may have a larger width than the natural width of source-level floating-point data types, allowing for intermediate floating-point results to be computed to a greater precision and numeric range; but this extended precision and range is not usually available to the user of a high-level language (such as C or C++).

In order to provide access to the full width of the floating point registers for either ordinary floating-point arithmetic or for inline assembly constructs involving floating-point operands, therefore, a new built-in data type is also disclosed herein, named "_fpreg" for the C programming language, corresponding to a floating point representation that is as wide as the floating-point registers of the underlying processor. Users may take advantage of the new data type in conjunction with the disclosed methods for the embedding of a machine instruction by using this data type for the parameters and/or return value of an intrinsic that maps to a floating-point machine instruction.

It is therefore a technical advantage of the present invention to enable a flexible, easy to understand language-compatible syntax for embedding or inlining machine instructions into source code.

It is a further technical advantage of the present invention to enable the compiler to perform semantic checks on the embedded machine instructions that are specified by invoking prototyped intrinsic routines, in much the same way that semantic checks are performed on calls to prototyped user routines.

It is a still further technical advantage of the present invention to enable inline assembly support to be extended to new machine instructions in a streamlined manner that greatly minimizes the need to modify compiler source code.

It is a yet further technical advantage of the present invention to enable user-controlled optimization of embedded low-level "system" machine instructions.

It is another technical advantage of the present invention to enable, where supported, cross-module optimizations, notably inlining, of library routines that contain embedded machine instructions.

Another technical advantage of the present invention is, when used in conjunction with the new _fpreg data type also disclosed herein, to support and facilitate reference to floating-point machine instructions in order to provide access to the full width of floating-point registers provided by a processor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes as the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
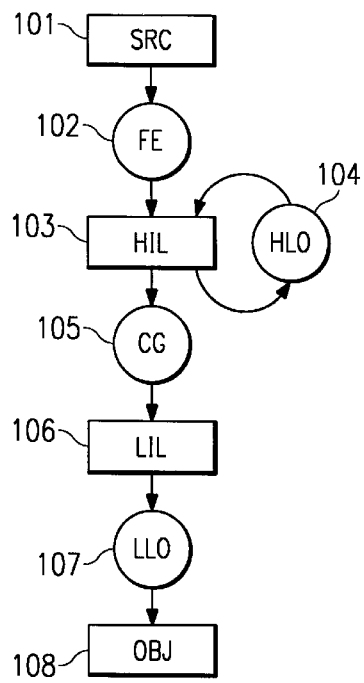
FIG. 1 illustrates a typical compiler system in which the present invention may be enabled.

Turning first to FIG. 1, a typical compilation process is illustrated upon which a preferred embodiment of the present invention may be enabled. The compiler transforms the source program on which it operates through several representations. Source code 101 is a representation created by the programmer. Front-end processing 102 transforms source code 101 into a high-level intermediate representation 103 used within the compiler. At this high-level intermediate stage, the associated high-level intermediate representation 103 is advantageously (although not mandatorily) passed through high-level optimizer 104 to translate the representation into a more efficient high-level intermediate representation. Code generator 105 then translates high-level intermediate representation 103 into low-level intermediate representation 106, whereupon a low-level optimizer 107 translates low-level intermediate representation 106 into an efficient object code representation 108 that can be linked into a machine-executable program. It will be appreciated that some compilers are known in the art in which front-end and code generation stages 102 and 105 are combined (removing the need for high-level intermediate representation 103), and in others, the code generation and low-level optimizing stages 105 and 107 are combined (removing the need for low-level intermediate representation 106). Other compilers are known that add additional representations and translation stages. Within this basic framework, however, the present invention may be enabled on any analogous compiler performing substantially the steps described on FIG. 1.

Figure 2:
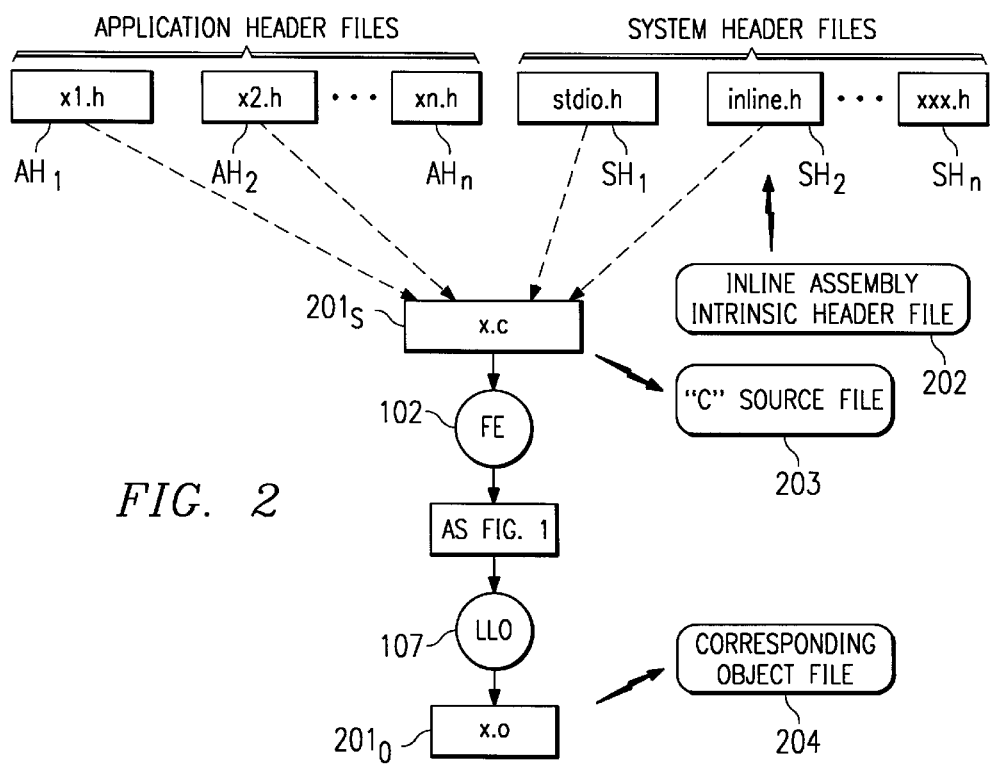
FIG. 2 illustrates the availability of an inline assembly intrinsic header file ("inline.h") $SH_2$ as a system header file containing intrinsics through which machine instructions may be inlined in accordance with the present invention.

With reference now to FIG. 2, the source level specification features of the present invention will now be discussed. It will be appreciated that consistent with earlier disclosure in the background and summary sections set forth above, the present invention provides a mechanism by which machine instructions may be embedded into source code to enable improved levels of smooth and efficient compilation thereof, advantageously responsive to selected optimization restrictions ordained by the programmer.

In a preferred embodiment herein, the invention is enabled on compilation of C source code. It will be appreciated, however, that use of the C programming language in this way is exemplary only, and that the invention may be enabled analogously on other high-level programming languages, such as C++ and FORTRAN, without departing from the spirit and scope of the invention.

Turning now to FIG. 2, it should be first noted that blocks 202, 203 and 204 are explanatory labels and not part of the overall flow of information illustrated thereon. On FIG. 2, machine instructions are embedded or "inlined" into C source code 201. by the user, through the use of "built-in"

pseudo-function (or "intrinsic") calls. Generally, programs that make intrinsic calls may refer to and incorporate several types of files into source code $201_s$, such as application header files $AH_1$–$AH_n$, or system header files $SH_1$–$SH_n$. In the exemplary use of C source code described herein, the present invention is enabled through inclusion of system header file $SH_2$ on FIG. 2, namely an inline assembly intrinsic header file (see label block 202). The file is specified as set forth below in detail so that, when included in source code $201_s$, the mechanism of the present invention will be enabled.

Note that as shown on FIG. 2, the inline assembly intrinsic header file $SH_2$ (named "inline.h" on FIG. 2 to be consistent with the convention on many UNIX®-based systems) typically contains declarations of symbolic constants and intrinsic function prototypes (possibly just as comments), and typically resides in a central location along with other system header files $SH_1$–$SH_n$. The "inline.h" system header file $SH_2$ may then be "included" by user programs that embed machine instructions into source code, enabling the use of __Asm_opcode intrinsics.

Figure 3:
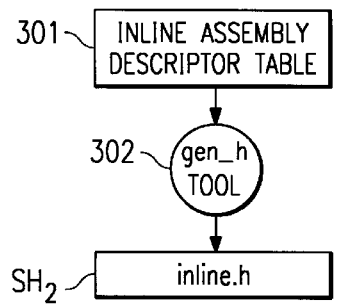
FIG. 3 illustrates use of inline assembly descriptor table 301 to generate the "inline.h" system header file.

With reference to FIG. 3, it will be seen that a software tool 302 advantageously generates "inline.h" system header file $SH_2$ from an inline assembly descriptor table 301 at the time the compiler product is created. This table-driven approach is described in more detail later.

Returning to FIG. 2, when an inline assembly intrinsic header file specified in accordance with the present invention is included in a user program, processing continues to convert source code $201_s$ into object code $201_o$ in the manner illustrated on FIG. 1.

Syntax

The general syntax for the pseudo-function call/intrinsic call in C is as follows:

opcode_result=__Asm_opcode (<completer_list>, <operand list> [,<serialization_constraint>]);

A unique built-in function name (denoted above as __Asm_opcode) is defined for each assembly instruction that can be generated using the inline assembly mechanism. The inline assembly instructions may be regarded as external functions for which implicit external declarations and function definitions are provided by the compiler. These intrinsics are not declared explicitly by the user programs. Moreover, the addresses of the inline assembly intrinsics may not be computed by a user program.

The "__Asm_opcode" name is recognized by the compiler and causes the corresponding assembly instruction to be generated. In general, a unique Asm_opcode name is defined for each instruction that corresponds to a supported inline assembly instruction.

The first arguments to the __Asm_opcode intrinsic call, denoted as <completer_list> in the general syntax description, are symbolic constants for all the completers associated with the opcode. The inline assembly opcode completer arguments are followed by the instruction operands, denoted as <operand_list> in the general syntax description, which are specified in order according to protocols defined by particular instruction set architectures. Note that if an embedded machine instruction has no completers, then the <completer_list> and its following comma is omitted. Similarly, if the embedded machine instruction has no operands, then the <operand_list> and its preceding comma is omitted.

An operand that corresponds to a dedicated machine register (source or target) may be specified using an appropriate symbolic constant. Such symbolic constants are typically defined in the "inline.h" system header file discussed above with reference to FIG. 2. An immediate operand is specified as a simple integer constant and generally should be no larger than the corresponding instruction field width.

To be compatible, a source language expression having a scalar data type must be specified as the argument corresponding to a general purpose or floating-point register source operand. In particular, a general purpose register source operand must be specified using an argument expression that has an arithmetic data type (i.e. integral or floating-point type). An operand may nonetheless be of any type within this requirement for compatibility. For example, an operand may be a simple variable, or alternatively it may be an arithmetic expression including variables.

Typically, the compiler will convert the argument value for a general-purpose register source operand into an unsigned integer value as wide as the register width of the target machine (e.g. 32-bits or 64-bits).

Where a general-purpose register operand clearly corresponds to a memory address, an argument value having a pointer type may be required.

Any general purpose or floating-point register target operand value defined by an inline assembly instruction is treated as the return value of the __Asm_opcode pseudo-function call.

A general-purpose register target operand value is typically treated as an unsigned integer that is as wide as the register-width of the target architecture (e.g. 32-bits or 64-bits). Therefore, the pseudo-function return value will be subject to the normal type conversions associated with an ordinary call to a function that returns an unsigned integer value.

To avoid potential loss of precision when operating on floating-point values, however, floating-point register target and source operands of embedded machine instructions in a preferred embodiment are allowed to be as wide as the floating-point register-width of the target architecture. For architectures where the floating-point register-width exceeds the natural memory-width of standard floating-point data types (e.g. the "float" and "double" standard data types in the C language), the new "__fpreg" data type may be used to declare the arguments and return value of inline assembly intrinsics used to embed floating-point instructions into source code. As explained in more detail elsewhere in this disclosure, the "__fpreg" data type corresponds to a floating-point representation that is as wide as the floating-point registers of the target architecture.

The following examples illustrate the source code specification technique of the present invention as described immediately above:

i) For an "ADD" machine instruction of the form:

ADD r1=r2, r3 where r1, r2, and r3 correspond to 64-bit general-purpose machine registers, the function prototype for the inline intrinsic can be defined as follows:

UInt64 __Asm_ADD (UInt64 r2, UInt64 r3)

where "UInt64" corresponds to a 64-bit unsigned integer data-type.

The ADD machine instruction can then be embedded into a "C" source program as follows:

include <inline.h>
int g1, g2, g3; /* global integer variables */

```
main ( )
{
   g1=__Asm__ADD (g2, g3);
}
```
ii) For a "LOAD" machine instruction of the form:

LOAD.<size> value=[mem_addr]

where
    <size> is an opcode completer encoding the bit-size of the object being loaded which may be one of "b" (for byte or 8-bits), "hw" (for half-word or 16-bits) or "word" (for word or 32-bits),
    "value" corresponds to a 32-bit general-purpose machine register whose value is to be set by the load instruction
    "mem_addr" corresponds to a 32-bit memory address that specifies the starting location in memory of the object whose value is to be loaded into "value" the function prototype for the inline intrinsic can be defined as follows:

UInt32 __Asm__LOAD (__Asm__size size, void * mem_addr)

where "UInt32" corresponds to a 32-bit unsigned integer data-type, "void *" is a generic pointer data type, and "__Asm__size" is a enumeration type that encodes one of 3 possible symbolic constants. For example, in the C language, __Asm__size may be defined as follows:

```
typedef enum {
     _b    = 1,
     _hw   = 2,
     _w    = 3
} __Asm__size;
```

Alternatively, __Asm__size may be defined to be a simple integer data type with pre-defined symbolic constant values for each legal LOAD opcode completer. Using language neutral "C" pre-processor directives,
   #define _b (1)
   #define _hw (2)
   #define _w (3)
Note that the declarations associated with "__Asm__size" would be placed in the "inline.h" system header file, and would be read in by the compiler when parsing the source program. The LOAD machine instruction can then be embedded into a "C" program thusly:

```
#include <inline.h>
int g;        /* global integer variable */
int *p;       /* global integer pointer variable */
main ()
{
     g = __Asm__LOAD (_w, p);
}
```

Certain inline assembly opcodes, notably those that may be considered as privileged "system" opcodes, may optionally specify an additional argument that explicitly indicates the constraints that the compiler must honor with regard to instruction re-ordering. This optional "serialization constraint" argument is specified as an integer mask value. The integer mask value encodes what types of (data independent) instructions may be moved past the inline assembly opcode in either direction in a dynamic sense (i.e. before to after, or after to before) in the current function body. If omitted, the compiler will use a default serialization mask value. For the purposes of specifying serialization constraints in a preferred embodiment, the instruction opcodes may advantageously, but not mandatorily, be divided into the following categories:
1. Memory Opcodes: load and store instructions
2. ALU Opcodes: instructions with general-purpose register operands
3. Floating-Point Opcodes: instructions with floating-point register operands
4. System Opcodes: privileged "system" instructions
5. Branch: "basic block" boundary
6. Call: function invocation point With respect to serialization constraints, an embedded machine instruction may act as a "fence" that prevents the scheduling of downstream instructions ahead of it, or a "fence" that prevents the scheduling of upstream instructions after it. Such constraints may be referred to as a "downward fence" and "upward fence" serialization constraint, respectively. Given this classification, the serialization constraints associated with an inline system opcode can be encoded as an integer value, which can be defined by ORing together an appropriate set of constant bit-masks. For a system opcode, this encoded serialization constraint value may be specified as an optional final argument of the __Asm__opcode intrinsic call. For example, for the C language, the bit-mask values may defined to be enumeration constants as follows:

```
typedef enum {
     __NO__FENCE          = 0 x 0,
     __UP__MEM__FENCE     = 0 x 1,
     __UP__ALU__FENCE     = 0 x 2,
     __UP__FLOP__FENCE    = 0 x 4,
     __UP__SYS__FENCE     = 0 x 8,
     __UP__CALL__FENCE    = 0 x 10,
     __UP__BR__FENCE      = 0 x 20,
     __DOWN__MEM__FENCE   = 0 x 100,
     __DOWN__ALU__FENCE   = 0 x 200,
     __DOWN__FLOP__FENCE  = 0 x 400,
     __DOWN__SYS__FENCE   = 0 x 800,
     __DOWN__CALL__FENCE  = 0 x 1000,
     __DOWN__BR__FENCE    = 0 x 2000
} __Asm__fence;
```

(Note: The __Asm__fence definition would advantageously be placed in the "inline.h" system header file.)

So, for example, to prevent the compiler from scheduling floating-point operations across an inlined system opcode that changes the default floating-point rounding mode, a programmer might use an integer mask formed as (__UP__FLOP__FENCE | __DOWN__FLOP__FENCE).

The __UP__BR__FENCE and __DOWN__BR__FENCE relate to "basic block" boundaries. (A basic block corresponds to the largest contiguous section of source code without any incoming or outgoing control transfers, excluding function calls.) Thus, a serialization constraint value formed by ORing together these two bit masks will prevent the compiler from scheduling the associated inlined system opcode outside of its original basic block.

Note that the compiler must automatically detect and honor any explicit data dependence constraints involving an inlined system opcode, independent of its associated serialization mask value. So, for example, just because an inlined system opcode intrinsic call argument is defined by an integer add operation; it is not necessary to explicitly specify the __UP__ALU__FENCE bit-mask as part of the serialization constraint argument.

The serialization constraint integer mask value may be treated as an optional final argument to the inline system opcode intrinsic invocation. If this argument is omitted, the compiler may choose to use any reasonable default serialization mask value (e.g. 0x3D3D—full serialization with all other opcode categories except ALU operations). Note that if a system opcode instruction is constrained to be serialized with respect to another instruction, the compiler must not schedule the two instructions to execute concurrently.

To specify serialization constraints at an arbitrary point in a program, a placeholder inline assembly opcode intrinsic named __Asm__sched__fence may be used. This special intrinsic just accepts one argument that specifies the serialization mask value. The compiler will then honor the serialization constraints associated with this placeholder opcode, but omit the opcode from the final instruction stream.

The scope of the serialization constraints is limited to the function containing the inlined system opcode. By default, the compiler may assume that called functions do not specify any inlined system opcodes with serialization constraints. However, the __Asm__sched__fence intrinsic may be used to explicitly communicate serialization constraints at a call-site that is known to invoke a function that executes a serializing system instruction.

Example:
If a flush cache instruction ("FC" opcode) is a privileged machine instruction that is to be embedded into source code and one that should allow user-specified serialization constraints, the following inline assembly intrinsic may be defined:

void __Asm__FC ([serialization__constraint__specifier])

where the return type of the intrinsic is declared to be "void" to indicate that no data value is defined by the machine instruction.

Now the FC instruction may be embedded in a C program with serialization constraints that prevent the compiler from re-ordering memory instructions across the FC instruction as shown below:

```
#include <inline.h>
int g1, g2;   /* global integer variables */
main ()
{
    g1 = 0;      /* can't be moved after FC instruction */
    __Asm__FC
    (__UP__MEMORY__FENCE | __DOWN__MEMORY__FENCE);
    g2 = 1;      /* can't be moved before FC instruction */
}
```

Note that the __Asm__FC instruction specifies memory fence serialization constraints in both directions preventing the re-ordering of the stores to global variables g1 and g2 across the FC instruction.

Use of Table-driven Approach

A table-driven approach is advantageously used to help the compiler handle assembly intrinsic operations. The table contains one entry for each intrinsic, with the entry describing the characteristics of that intrinsic. In a preferred embodiment, although not mandatorily, those characteristics may be tabulated as follows:
(a) The name of the intrinsic
(b) A brief textual description of the intrinsic
(c) Names and types of the intrinsic arguments (if any)
(d) Name and type of the intrinsic return value (if any)
(e) With momentary reference back to FIG. 1, additional information for code generator 105 to perform the translation from high level intermediate representation 103 to low level intermediate representation 106

It will be appreciated that this table-driven approach enables the separation of the generation of the assembly intrinsic header file, parsing support library, and code generation utilities from the compiler's mainstream compilation processing. Any maintenance to the table may be made (such as adding to the list of supported inlined instruction) without affecting the compiler's primary processing functionality. This makes performing such maintenance easy and predictable. The table-driven approach is also user programming language independent, extending the versatility of the present invention.

On a more detailed level, at least three specific advantages are offered by this table-driven approach:

1. Header File Generation

The table facilitates generation of a file that documents intrinsics for user programmers, providing intrinsic function prototypes and brief descriptions. Using table elements (a), (b), (c) and (d) as itemized above, and with reference again to the preceding discussion accompanying FIG. 3, a software tool 302 generates an "inline.h" system header $SH_2$ from inline assembly descriptor table 301. Furthermore, "inline.h" system header $SH_2$ also defines and contains an enumerated set of symbolic constants, registers, completers, and so forth, that the programmer may use as legal operands to inline assembly intrinsic calls in the current program. Further, in cases where an operand is a numeric constant, "inline.h" system header $SH_2$ documents the range of legal values for the operand, which is checked by the compiler.

2. Parsing Library Generation

The table facilitates generation of part of a library that assists, with reference again now to FIG. 1, front end processing ("FE") 102 in recognizing intrinsics specified by the programmer in source code 101, validating first that the programmer has written such intrinsics legally, and then translating the intrinsics into high-level intermediate representation 103.

Note that in accordance with the present invention, it would also be possible to generate intrinsic-related front-end processing directly. In a preferred embodiment, however, library functionality is used.

Table-driven front-end processing enables an advantageous feature of the present invention, namely the automatic syntax parsing and semantics checking of the user's inline assembly code by FE 102. This feature validates that code containing embedded machine instructions is semantically correct when it is incorporated into source code 101 in the same way that a front end verifies that an ordinary function invocation is semantically correct. This frees other processing units of the compiler, such as code generator 105 and low level optimizer 107, from the time-consuming task of error checking.

Figure 5:
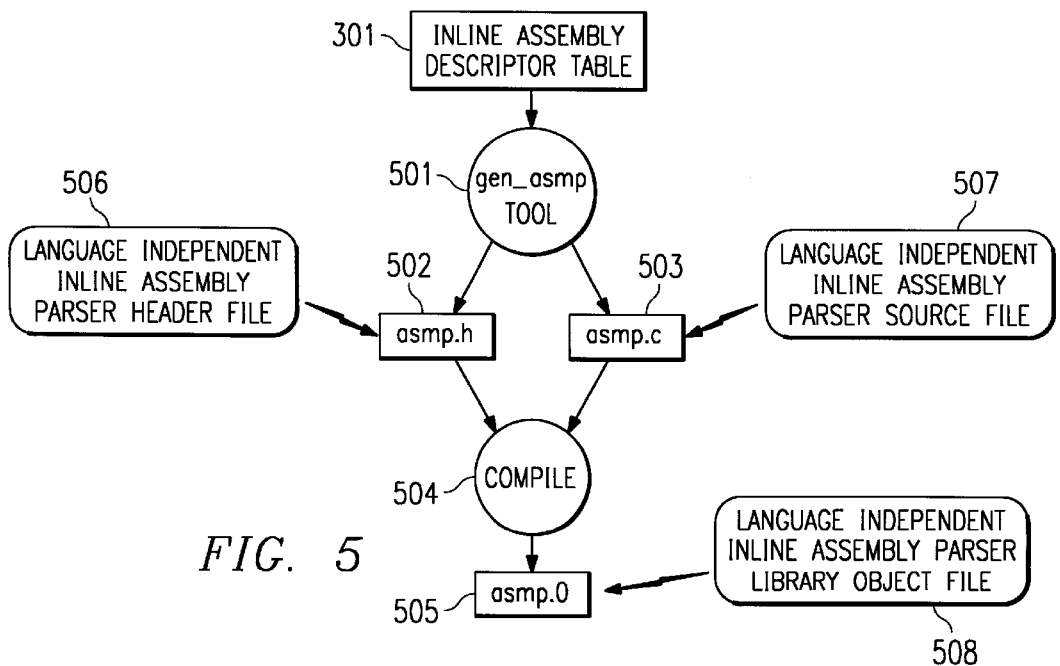
FIG. 5 illustrates use of inline assembly descriptor table 301 to create a library to assist front-end validation of intrinsics during the compilation thereof.
Figure 6:
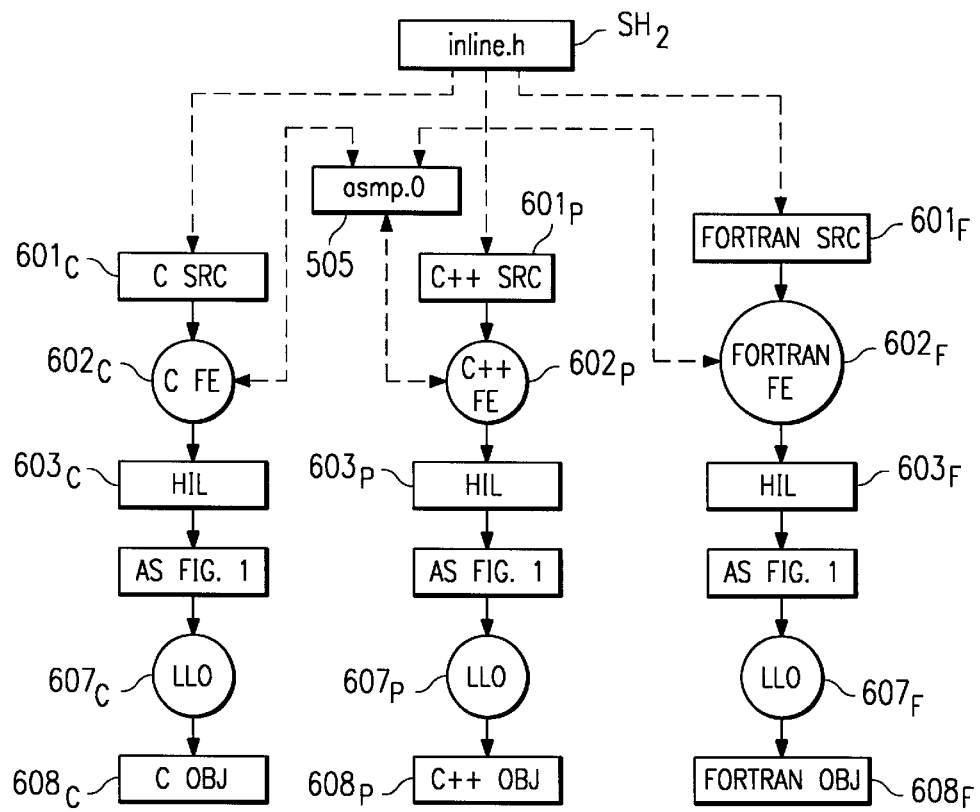
FIG. 6 illustrates the language independent nature of file and library generation in accordance with the present invention.

This front-end validation through reference to a partial library is enabled by generation of a header file as illustrated on FIGS. 5 and 6. Turning first to FIG. 5, in which it should again be noted that blocks 506, 507 and 508 are explanatory items and not part of the information flow, inline assembly descriptor table 301 provides elements (a), (c) and (d) as itemized above to software tool 501. This information enables software tool 501 to generate language-independent inline assembly parser header file ("asmp.h"), which may then be included into corresponding source code "asmp.c" 503 and compiled 504 into corresponding object code "asmp.o" 505. It will thus be seen from FIG. 5 that "asmp.o" 505 is a language-independent inline assembly parser library object file in a form suitable for assisting FE 102 on FIG. 1.

With reference now to FIG. 6, it will be seen that "inline.h" system header $SH_2$ provides legal intrinsics for a programmer to invoke from source code 601. On FIG. 6, exemplary illustration is made of C source code $601_c$, C++ source code $601_p$, and FORTRAN source code $601_f$, although the invention is not limited to these particular programming languages, and will be understood to be also enabled according to FIG. 6 on other programming languages. It will be noted that each of the illustrated source codes $601_c$, $601_p$, and $601_f$ have compiler operations and sequences 601–608 analogous to FIG. 1. Further, "asmp.o" library object file 505, being language independent, is universally available to C FE $602_c$, C++ FE $602_p$ and FORTRAN FE $602_f$ to assist in front-end error checking. Front end processing FE 602 does this checking by invoking utility functions defined in "asmp.o" library object file 505 to ensure that embedded machine instructions encountered in source code 601 are using the correct types and numbers of values. This checking is advantageously performed before actual code for embedded machine instructions is generated in high-level intermediate representation 603.

In this way, it will be appreciated that various potential errors may be checked in a flexible, table-driven manner that is easily maintained by a programmer. For example, errors that may be checked include:

whether the instruction being inlined is supported.
whether the number of arguments passed is correct.
whether the arguments passed are of the correct type.
whether the values of numeric integer constant arguments, if any, are within the allowable range.
whether the serialization constraint specifier is allowed for the specified instruction.

Furthermore, the table also allows the system to compute the default serialization mask for the specified instruction if one is needed but not supplied by the user.

3. Code Generation

The table 301 facilitates actual code generation (as shown on FIG. 1) by assisting CG 105 in translation of high level intermediate representation ("HIL") 103 to low level intermediate representation ("LIL") 106. Specifically, the table assists CG 105 in translating intrinsics previously incorporated into source code 101. The table may also, when processed into a part of CG 105, perform consistency checking to recognize certain cases of incorrect HIL 103 that were not caught by error checking in front end processing ("FE") 102.

Figure 4:
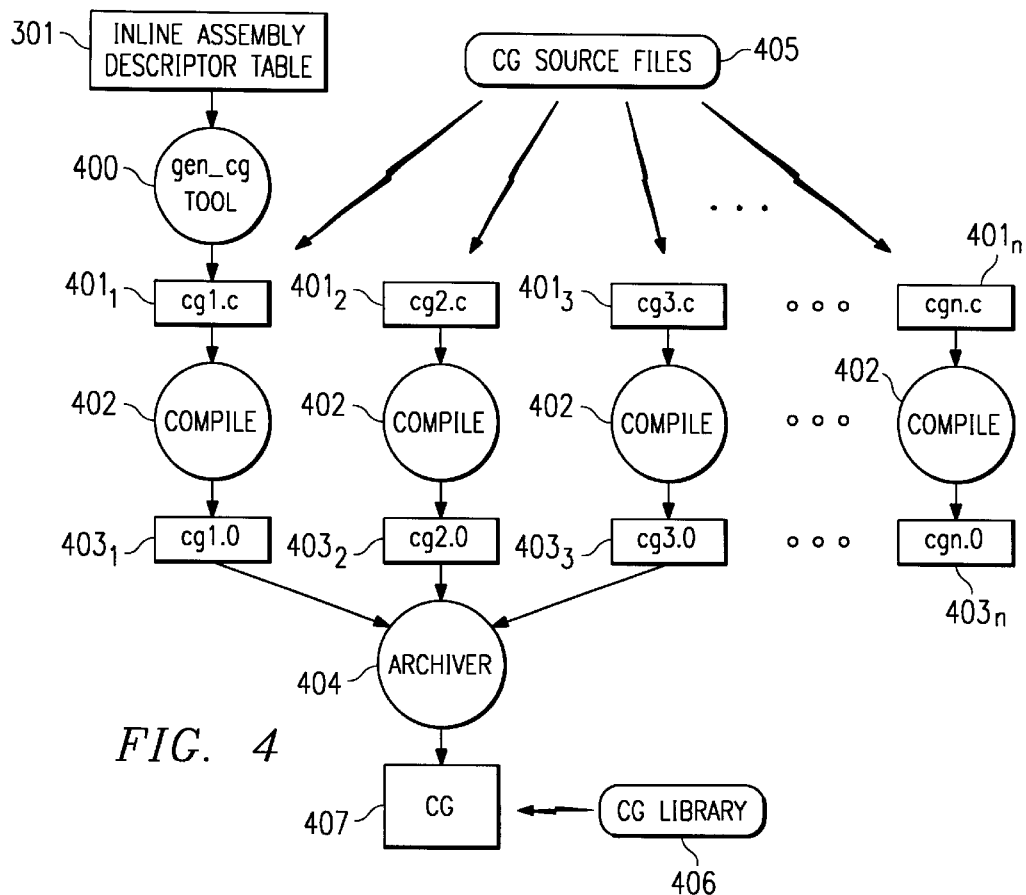
FIG. 4 illustrates use of inline assembly descriptor table 301 to generate a library of low-level object files available to assist translation of intrinsics from a high level intermediate representation of code to a low level intermediate representation thereof.

Note that according to the present invention, it would also be possible to generate a library of CG object files to assist CG 105 in processing intrinsics, similar to library 505 that assists FE 102, as illustrated on FIG. 5. Turning now to FIG. 4, and again noting that blocks 405 and 406 are explanatory items and not part of the information flow, inline assembly descriptor assembly table 301 provides elements (c), (d) and (e) as itemized above to software tool 400. Using this information, software tool 400 generates CG source file $401_1$, which in turn is compiled along with ordinary CG source files $401_2$–$401_n$ (blocks 402) into CG object files $403_1$–$403_n$. Archiver 404 accumulates CG object files $403_1$–$403_n$ into CG library 407.

In more detail now, the foregoing translation from HIL 103 to LIL 106 for intrinsics includes the following phases:

A. Generation of data structures

Automation at compiler-build time generates, for each possible intrinsic operation, a data structure that contains information on the types of the intrinsic arguments (if any) and the type of the return value (if any).

B. Consistency checking

At compiler-run time, a portion of CG that performs consistency checking on intrinsic operations can consult the appropriate data structure from A immediately above. This portion of CG does not need to be modified when a new intrinsic operation is added, unless the language in which the table 301 is written has changed.

C. Translation from HIL to LIL

Most intrinsic operations can be translated from HIL to LIL automatically, using information from the table. In a preferred embodiment, an escape mechanism is also advantageously provided so that an intrinsic operation that cannot be translated automatically can be flagged to be translated later by a hand-coded routine. The enablement of the escape mechanism does not affect automatic consistency checking.

The representation of an intrinsic invocation in HIL identifies the intrinsic operation and has a list of arguments; there may be an implicit return value. The representation of an intrinsic invocation in LIL identifies a low-level operation and has a list of arguments. The translation process must retrieve information from the HIL representation and build up the LIL representation. There are a number of aspects to this mapping:

i. The identity of the intrinsic operation in HIL may be expressed by one or more arguments in LIL. Information in element (e) in the inline assembly descriptor table set forth above is used to generate code expressing this identity in LIL.

ii. The implicit return value (if any) from HIL is expressed as an argument in LIL.

iii. Arguments of certain types in HIL must be translated to arguments of different types in LIL. The translation utility for any given argument type must be hand-coded, although the correct translation utility is invoked automatically by the translation process for the intrinsic operation.

iv. The serialization mask (if any) from HIL is a special attribute (not an argument) in LIL.

v. The LIL arguments must be emitted in the correct order. Information in element (e) in the inline assembly descriptor table as set forth above describes how to take the identity arguments from (i), the return value argument (if any) from (ii), and any other HIL arguments, and emit them into LIL in the correct order.

For each possible intrinsic operation, the tool run at compiler-build time creates a piece of CG that takes as input the HIL form of that intrinsic operation and generates the LIL form of that intrinsic operation.

In a preferred embodiment, the tool run at compiler-build time advantageously recognizes when two or more intrinsic operations are translated using the same algorithm, and generates a single piece of code embodying that algorithm that can perform translations for all of those intrinsic operations. When this happens, information on the identity of the intrinsic operation described in (i) above is stored in the same data structures described in A further above, so that the translation code can handle the multiple intrinsic operations. In the preferred embodiment, translation algorithms for two intrinsic operations are considered "the same" if all of the following hold:

The HIL forms of the operations have the same number of arguments of the same types in the same order.

The HIL forms of the operations either both lack a return value or have the same return type.

The identity information is expressed in the LIL forms of the operations using the same number of arguments of the same types.

The LIL arguments for the operations occur in the same order.

In summary, within the internal program representations used by the compiler, the inlining of assembly instructions may be implemented as special calls in the HIL that the front end generates. Every assembly instruction supported by inlining is defied as part of this intermediate language.

When an inlined assembly instruction is encountered in the source, after performing error checking, the FE would emit, as part of the HIL, a call to the corresponding dedicated HIL routine.

The CG then replaces each such call in the HIL with the corresponding machine instruction in the LIL which is then subject to optimizations by the LLO, without violating any associated serialization constraint specifiers (as discussed above).

In addition to facilitating code generation from HIL to LIL, the table-driven approach advantageously assists code generation in other phases of the compiler. For example, and with reference again to FIG. 1, the table could also be extended to generate part of HLO 104 or LLO 107 for manipulating assembly intrinsics (or to generate libraries to be used by HLO 104 or LLO 107). This could be accomplished, for instance, by having the table provide semantic information on the intrinsics that indicates optimization freedom and optimization constraints. Although the greatest benefit comes from using the table for as many compiler stages as possible, this approach applies equally well to a situation in which only some of the compiler stages use the table—for example, where neither HLO 104 nor LLO 107 use the table.

Although the preferred embodiment does Library Generation and Partial Code Generator Generation (as described above) at compiler-build time, it would not be substantially different for FE 102, CG 105, or some library to consult the table (or some translated form of the table) at compiler-run time instead.

Furthermore, although this approach has been disclosed to apply to assembly intrinsics, it could equally well be applied to any set of operations where there is at least one compiler stage that takes a set of operations in a regular form and translates them into another form, where the translation process can occur in a straightforward and automated fashion.

Each time a new intrinsic operation needs to be added to the compiler, a new entry is added to the table of intrinsic operations. A compiler stage that relies on the table-driven approach usually need not be modified by hand in order to manipulate the new intrinsic operation (the exception is if the language in which the table itself is written has to be extended—for example, to accommodate a new argument type or a new return type; in such a case it is likely that compiler stages and automation that processes the table will have to be modified). Reducing the amount of code that must be written by hand makes it simpler and quicker to add support for new intrinsic operations, and reduces the possibility of error when adding new intrinsic operations.

A further advantageous feature enabled by the present invention is that key library routines may now access machine instruction-level code so as to optimize run-time performance. Performance-critical library routines (e.g. math or graphics library routines) often require access to low-level machine instructions to achieve maximum performance on modern processors. In the current art, they are typically hand-coded in assembly language.

As traditionally performed, hand-coding of assembly language has many drawbacks. It is inherently tedious, it requires detailed understanding of microarchitecture performance characteristics, it is difficult to do well and is error-prone, the resultant code is hard to maintain, and, to achieve optimal performance, the code requires rework for each new implementation of the target architecture.

In a preferred embodiment of the present invention, performance-critical library routines may now be coded in high-level languages, using embedded machine instructions as needed. Such routines may then be compiled into an object file format that is amenable to cross-module optimization and linking in conjunction with application code that invokes the library routines. Specifically, the library routines may be inlined at the call sites in the application program and optimized in the context of the surrounding code.

Figure 7:
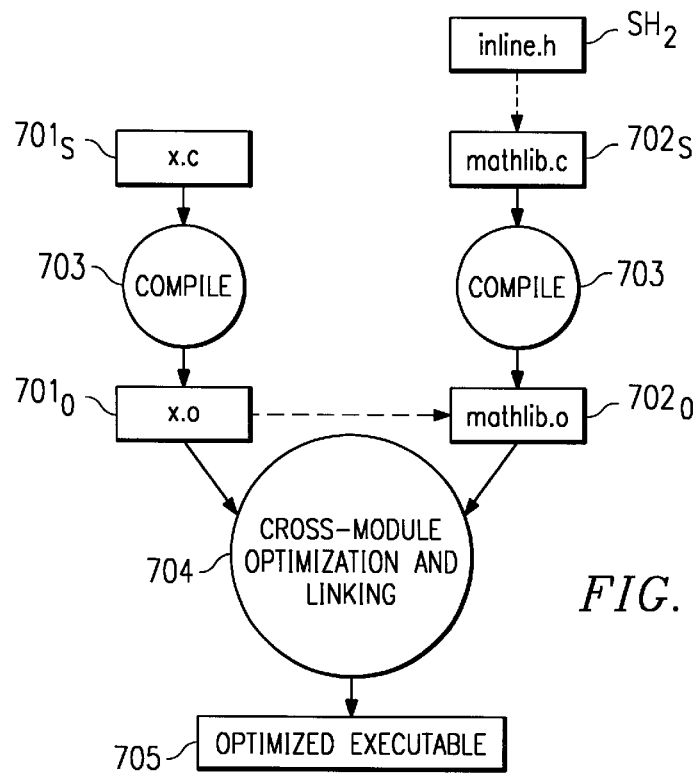
FIG. 7 illustrates an application of the present invention, where cross-module optimization and linking is supported, to enable performance critical library routines (such as math functions) to access low-level machine instructions and still allow such routines to be inlined into user applications.

With reference to FIG. 7, intrinsics defined in "inline.h" system header file $SH_2$ enable machine instructions to be embedded, for example, in math library routine source code $702_s$. This "mathlib" source code $702_s$ is then compiled in accordance with the present invention into equivalent object code $702_o$. Meanwhile, source code $701_s$ wishing to invoke the functionality of "mathlib" is compiled into object code $701_o$ in the traditional manner employed for cross-module optimization. Cross-module optimization and linking resources 704 then combine the two object codes $701_o$ and $702_o$ to create optimized executable code 705.

In FIG. 7, it should be noted that the math library is merely used as an example. There are other analogous high-performance libraries for which the present invention brings programming advantages, e.g., for graphics, multimedia, etc.

In addition to easing the programming burden on library writers, the ability to embed machine instructions into source code spares the library writers from having to re-structure low-level hand-coded assembly routines for each implementation of the target architecture.

Floating Point ("__fpreg") Data Type

The description of a preferred embodiment has so far centered on the inventive mechanism disclosed herein for inlining machine instructions into the compilation and optimization of source code. It will be appreciated that this mechanism will often be called upon to compile objects that include floating-point data types. A new data type is also disclosed herein, named "__fpreg" in the C programming language, which allows general programmatic access (including via the inventive machine instruction inlining mechanism) to the widest mode floating-point arithmetic supported by the processor. This data type corresponds to a floating-point representation that is as wide as the floating-point registers of the underlying processor. It will be understood that although discussion of the inventive data type herein centers on "__fpreg" as named for the C programming language, the concepts and advantages of the inventive data type are applicable in other programming languages via corresponding data types given their own names.

A precondition to fully enabling the "__fpreg" data type is that the target processor must of course be able to support memory access instructions that can transfer data between its floating-point registers and memory without loss of range or precision.

Depending on the characteristics of the underlying processor, the "__fpreg" data type may be defined as a data type that either requires "active" or "passive" conversion. The distinction here is whether instructions are emitted when converting a value of "__fpreg" data type to or from a value of another floating-point data type. In an active conversion, a machine instruction would be needed to effect the conversion whereas in a passive conversion, no machine instruction would be needed. In either case, the memory representation of an object of "__fpreg" data type is defined to be large enough to accommodate the full width of the floating-point registers of the underlying processor.

The type promotion rules of the programming language are advantageously extended to accommodate the __fpreg data type in a natural way. For example, for the C programming language, it is useful to assert that binary operations involving this type shall be subject to the following promotion rules:

1. First, if either operand has type __fpreg, the other operand is converted to __fpreg.
2. Otherwise, if either operand has type long double, the other operand is converted to long double.
3. Otherwise, if either operand has type double, the other operand is converted to double.

Note that in setting the foregoing exemplary promotion rules, it is assumed that the __fpreg data type which corresponds to the full floating-point register width of the target processor has greater range and precision than the long double data type. If this is not the case, then the first two rules may need to be swapped in sequence.

Note also that in general, assuming type __fpreg has greater range and/or precision than type long double, it may be that the result of computations involving __fpreg values cannot be represented precisely as a value of type long double. The behavior of the type conversion from __fpreg to long double (or to any other source-level floating-point type) must therefore be accounted for. A preferred embodiment employs a similar rule to that used for conversions from double to float: If the value being converted is out of range, the behavior is undefined; and if the value cannot be represented exactly, the result is either the nearest higher or the nearest lower representable value.

It will be further appreciated that the application and availability of the __fpreg data type is not required to be universal within the programming language. Depending on processor architecture and programmer needs, it is possible to limit availability of the __fpreg data type to only a subset of the operations that may be applied to other floating-point types.

To illustrate general programming use of this new data type, consider the following C source program that computes a floating-point 'dot-product' (a·b+c):

```
double a, b, c, d;
main ()
{
    d = (a * b) + c;
}
``` where the global variable d is assigned the result of the dot-product. For this example, according to the standard "usual arithmetic conversion rule" of the C programming language, the floating-point multiplication and addition expressions will be evaluated in the "double" data type using double precision floating-point arithmetic instructions. However, in order to exploit greater precision afforded by a processor with floating-point registers whose width exceeds that of the standard double data type, the __fpreg data type may alternatively be used as shown below:

```
double a, b, c, d;
main ()
{
    d = ((__fpreg) a * b) + c;
}
```

Note here that the variable "a" of type double is "typecast" into an __fpreg value. Hence, based on the previously mentioned extension to the usual arithmetic conversion rule, the variables "a", "b", and "c" of "double" type are converted (either passively or actively) into "__fpreg" type values and both the multiplication and addition operations will operate in the maximum floating-point precision corresponding to the full width of the underlying floating-point registers. In particular, the intermediate maximum precision product of "a" and "b" will not need to be rounded prior to being summed with "c". The net result is that a more accurate dot-product value will be computed and round-off errors are limited to the final assignment to the variable "d".

Applying the foregoing features and advantages of the __fpreg data type to the inventive mechanism disclosed herein for inlining machine instructions, it will be seen that the parameters and return values of intrinsics specified in accordance with that mechanism may be declared to be of this data type when such intrinsics correspond to floating point instructions.

For example, in order to allow source-level embedding of a floating-point fused-multiply add instruction:

fma fr4=fr1, fr2, fr3 that sums the product of the values contained in 2 floating-point register source operands (fr1 and fr2) with the value contained in another floating-point register source operand (fr3), and writes the result to a floating-point register (fr4), the following inline assembly intrinsic can be defined:

fr4=__fpreg__Asm__fma (__fpreg fr1, __fpreg fr2, __fpreg fr3)

Now, following the general programmatic example used above, this intrinsic can be used to compute a floating-point "dot-product" (a·b+c) in a C source program as follows:

```
double a, b, c, d;
main ()
{
    d = __Asm__fma (a, b, c);
}
``` where d is assigned the result of the floating-point computation ((a * b)+c)

Note that the arguments to __Asm__fma (a, b, and c) are implicitly converted from type double to type __fpreg when invoking the intrinsic, and that the intrinsic return value of type __fpreg is implicitly converted to type double for assignment to d. As discussed above, if type __fpreg has greater range and/or precision than type double, it may be that the result of the intrinsic operation (or indeed any other expression of type __fpreg) cannot be represented precisely as a value of type double. The behavior of the type conversion from __fpreg to double (or to any other source-level floating-point type, such as float) must therefore be accounted for. In a preferred embodiment, a similar rule is employed to that used for conversions from double to float: If the value being converted is out of range, the behavior is undefined; and if the value cannot be represented exactly, the result is either the nearest higher or nearest lower representable value.

If the result of the dot-product were to be used in a subsequent floating-point operation, it would be possible to minimize loss of precision by carrying out that operation in type __fpreg as follows:

```
double a, b, c, d, e, f, g;
main ()
{
__fpreg x, y;
        x = __Asm__fma (a, b, c);
        y = __Asm__fma (e, f, g);
        d = x + y;
}
```

Note that the results of the two dot-products are stored in variables of type __fpreg; the results are summed (still in type __fpreg), and this final sum is then converted to type double for assignment to d. This should produce a more precise result than storing the dot-product results in variables of type double before summing them. Also, note that the standard binary operator '+' is being applied to values of type __fpreg to produce an __fpreg result (which, as previously stated, must be converted to type double for assignment to d).

Conclusion

It will be further understood that the present invention may be embodied in software executable on a general purpose computer including a processing unit accessing a computer-readable storage medium, a memory, and a plurality of I/O devices.

Although the present invention and its advantages have been described in detail, it should be understood that various changes, substitutions and alterations can be made herein without departing from the spirit and scope of the invention as defined by the appended claims.

We claim:

1. A method for enabling a compiler to generate preselected machine instructions responsive to source level specification thereof, the method comprising the steps of:
   (a) predefining a series of source level intrinsics each having arguments and return values selectively associable therewith, each intrinsic indexed to preselected machine instructions, said machine instructions to be generated upon compiler recognition of the corresponding intrinsic, said series of intrinsics further being extensible to facilitate table-driven addition of supplemental intrinsics thereto;
   (b) selectively specifying said intrinsics in source code;
   (c) selectively associating arguments with ones of said specified intrinsics, ones of said arguments representing serialization constraints to be honored by the compiler when optimizing said generated machine instructions;
   (d) compiling the source code, said step (d) including the substeps of:
      (i) recognizing said specified intrinsics in the source code; and
      (ii) generating machine instructions corresponding to said recognized intrinsics, said generated machine instructions operating on user-selectable operands of unrestricted type, said substep (d)(ii) further including inlining library functions, the library functions invoked by the source code and containing machine instructions;
   (e) optimizing said generated machine instructions according to serialization constraints represented by arguments associated with said recognized intrinsics; and
   (f) when said generated machine instructions are floating-point instructions, selectively accessing the full range and precision of internal floating-point register representations corresponding thereto.

2. The method of claim 1, in which ones of said serialization constraints are enabled by combining together a set of constant bit-masks.

3. The method of claim 1, in which further ones of said arguments associated in step (c) represent completers to be honored by the compiler in generating machine instructions in step (d)(ii).

4. The method of claim 1, in which a predetermined file includes declarations that define symbolic constants, the symbolic constants disposed to be used as parameters to selected intrinsic calls.

5. The method of claim 4, in which the predetermined file is a system header file.

6. The method of claim 4, in which the predetermined file is generated from a table.

7. The method of claim 6, in which the table is consulted at a processing time selected from the group consisting of (1) compiler build time, and (2) compiler run time.

8. The method of claim 6, in which each intrinsic has a unique identifier including an opcode, the opcode serving as a key to referencing the table.

9. The method of claim 6, in which the table has a plurality of elements, each of said elements representing selected characteristics of intrinsics.

10. The method of claim 9, in which at least one element is a name for each intrinsic tabulated in the table, and at least one other element is selected from the group consisting of:
    (a) a corresponding description;
    (b) a corresponding set of valid argument names and types legally associable therewith; and
    (c) a corresponding set of legal return values expected from execution thereof.

11. The method of claim 6, in which the table provides legal operands and return values to support semantic validation of source level intrinsic specification.

12. The method of claim 1, in which steps (b) and (c) are enabled using a natural source specification syntax.

13. The method of claim 1, in which each intrinsic has a unique identifier comprising:
    a prefix, the prefix signifying membership of the intrinsic in said predefined series thereof; and
    an opcode, the opcode indicating the preselected machine instructions to which the intrinsic is indexed.

14. The method of claim 13, in which the prefix is __Asm.

15. The method of claim 1, in which step (d) further includes the substep of validating the semantic accuracy of the source code specified in steps (b) and (c).

16. The method of claim 1, in which at least one of said library functions is selected from the group consisting of:
    (a) a math library function; and
    (b) a graphics library function.

17. The method of claim 1, in which the source code is written in a programming language selected from the group consisting of:

(a) C;
(b) C++; and
(c) FORTRAN.

18. An improved computer program compiler disposed to transform source level code into a lower level representation thereof, the lower level representation including predetermined segments of lower level code directly specified at said source level, the improvement comprising:

a predefined set of source level intrinsics, each intrinsic indexed to corresponding ones of said predetermined segments of lower level code; and the compiler including:
means for recognizing said intrinsics when encountered during compilation of source level code;
means for generating segments of lower level code corresponding to said recognized intrinsics; and
means for optimizing said generated segments according to serialization constraints represented by arguments associated with said recognized intrinsics.

19. The improved compiler of claim 18, in which the set is also extensible to facilitate table-driven addition of supplemental intrinsics thereto.

20. The improved compiler of claim 18, in which the means for generating includes means for inlining library functions, the library functions invoked at said source level and containing machine instructions.

21. The improved compiler of claim 18, in which said generated segments operate on user-selectable operands of unrestricted type.

22. The improved compiler of claim 18, in which floating-point machine instructions in said generated segments may access the full range and precision of internal floating-point register representations corresponding thereto.

23. The improved compiler of claim 18, in which the lower level is a machine language.

24. The improved compiler of claim 18, in which said source level code is written in a language is selected from the group consisting of:
(a) C;
(b) C++; and
(c) FORTRAN.

25. The improved compiler of claim 18, in which said serialization constraints are enabled by combining together a set of constant bit-masks.

26. A computer program compiler disposed to generate preselected machine instructions responsive to source level specification thereof, comprising:

means for predefining a series of source level intrinsics, each intrinsic indexed to preselected machine instructions, said machine instructions to be generated upon compiler recognition of the corresponding intrinsic, said series of intrinsics further being extensible to facilitate table-driven addition of supplemental intrinsics thereto;

means for selectively specifying said intrinsics in source code; and means for compiling the source code, the means for compiling further including:
means for recognizing said specified intrinsics in the source code; and
means for generating machine instructions corresponding to said recognized intrinsics.

27. The compiler of claim 26, in which the means for compiling further includes means for optimizing said generated machine instructions according to serialization constraints represented by arguments associated with said recognized intrinsics.

28. The compiler of claim 26, in which the means for generating includes means for inlining library functions, the library functions invoked at said source level and containing machine instructions.

29. The compiler of claim 26, in which said generated machine instructions operate on user-selectable operands of unrestricted type.

30. The compiler of claim 26, in which floating-point machine instructions in said generated machine instructions may access the full range and precision of internal floating-point register representations corresponding thereto.

31. A method for enabling a compiler to generate preselected machine instructions responsive to source level specification thereof, the method comprising the steps of:

(a) predefining a series of source level intrinsics each having arguments and return values selectively associable therewith, each intrinsic indexed to preselected machine instructions, said machine instructions to be generated upon compiler recognition of the corresponding intrinsic;

(b) specifying ones of said intrinsics in source code; and (c) compiling the source code, said step (c) including the substeps of:
(i) recognizing said specified intrinsics in the source code; and
(ii) generating machine instructions corresponding to said recognized intrinsics; and (d) when said generated machine instructions are floating-point instructions, accessing the full range and precision of internal floating-point register representations corresponding thereto.

32. The method of claim 31, in which step (c) further includes the substep of optimizing said generated machine instructions according to serialization constraints represented by arguments associated with said recognized intrinsics.

33. The method of claim 31, in which the series is also extensible to facilitate table-driven addition of supplemental intrinsics thereto.

34. The method of claim 31, in which said generated machine instructions operate on user-selectable operands of unrestricted type.

35. A computer program product including computer readable logic recorded thereon for enabling a compiler to generate preselected machine instructions responsive to source-level specification thereof, the computer program product comprising:

a computer-readable storage medium; and a computer program stored on the computer-readable storage medium and operable on source code containing extensible intrinsics selected from a predefined set thereof, each intrinsic in the set indexed to preselected machine instructions, said preselected machine instructions to be generated upon compiler recognition of the corresponding intrinsic in the source code, the computer program comprising:
means for compiling the source code, said means for compiling further including:
means for recognizing intrinsics specified in the source code; and
means for generating machine instructions corresponding to said recognized intrinsics, said generated machine instructions operating on user-selectable operands of unrestricted type.

36. The computer program product of claim 35, in which the operands include general arithmetic expressions.

37. The computer program product of claim 35, in which the means for compiling further includes means for optimizing said generated machine instructions according to serialization constraints represented by arguments associated with said recognized intrinsics.

38. The computer program product of claim 37, in which ones of said serialization constraints are enabled by combining together a set of constant bit-masks.

39. The computer program product of claim 37, in which the means for generating also honors completers represented by arguments associated with said recognized intrinsics.

40. The computer program product of claim 35, in which the set is also extensible to facilitate table-driven addition of supplemental intrinsics thereto.

41. The computer program product of claim 35, in which floating-point machine instructions in said generated machine instructions may access the full range and precision of internal floating-point register representations corresponding thereto.

42. The computer program product of claim 35, in which the means for generating further includes means for inlining library functions, the library functions invoked by the source code and containing machine instructions.

43. The computer program product of claim 35, in which the computer program is further operable in conjunction with a predetermined file, the predetermined file including declarations that define symbolic constants, the symbolic constants disposed to be used as parameters to selected intrinsic calls.

44. The computer program product of claim 43, in which the predetermined file is a system header file.

45. The computer program product of claim 43, in which the predetermined file is generated from a table.

46. The computer program product of claim 45, in which the table has a plurality of elements, one of said elements representing a name for each intrinsic tabulated therein, at least one other element selected from the group consisting of:
  (1) a corresponding description;
  (2) a corresponding set of valid argument names and types legally associable therewith; and
  (3) a corresponding set of legal return values expected from execution thereof.

47. A method for enabling a compiler to generate preselected machine instructions responsive to source level specification thereof, the method comprising the steps of:
  (a) predefining a series of extensible source level intrinsics each having arguments selectively associable therewith, each intrinsic indexed to preselected machine instructions, said machine instructions to be generated upon compiler recognition of the corresponding intrinsic;
  (b) selectively specifying said intrinsics in source code;
  (c) selectively associating arguments with ones of said specified intrinsics, said arguments selected from the group consisting of:
    (i) completers to be honored by the compiler when generating machine instructions;
    (ii) operands on which generated machine instructions are to operate, the operands being user-selectable of unrestricted type, the operands further including floating-point operands, the floating-point operands corresponding to a floating-point representation in registers in an underlying processor that is as wide as said registers; and
    (iii) serialization constraints to be honored by the compiler when optimizing generated machine instructions, the serialization constraints enabled by combining together a set of constant bit-masks;
  (d) compiling the source code, said step (d) including the substeps of:
    (i) recognizing said specified intrinsics in the source code;
    (ii) validating the semantic accuracy of said specified intrinsics via reference to legal values contained in a predefined table, the table having a plurality of elements, one of said elements representing a name for each intrinsic tabulated therein, at least one other element selected from the group consisting of:
      (1) a corresponding description;
      (2) a corresponding set of valid argument names and types legally associable therewith; and
      (3) a corresponding set of legal return values expected from execution thereof; and
    (iii) generating machine instructions corresponding to said recognized intrinsics, said generated machine instructions disposed to be executed as object code according to arguments associated with said recognized intrinsics; and
  (e) causing the table also to generate a system header file, the system header file including declarations that define symbolic constants, the symbolic constants disposed to be used as parameters to selected intrinsic calls.

48. The method of claim 47, in which said intrinsic calls include inlining library functions containing embedded machine instructions.

49. The method of claim 47, in which the system header file generates machine instructions by further reference to a library thereof.

50. The method of claim 47, in which the table is consulted in step (d)(ii) at a processing time selected from the group consisting of (1) compiler build time, and (2) compiler run time.

51. The method of claim 47, in which steps (b) and (c) are enabled using a natural source specification syntax.

52. The method of claim 47, in which each intrinsic has a unique identifier comprising:
  a prefix, the prefix signifying membership of the intrinsic in said predefined series thereof; and
  an opcode, the opcode indicating the preselected machine instructions to which the intrinsic is indexed.

53. The method of claim 52, in which the prefix is _Asm.

54. The method of claim 47, in which step (d) is performed in an environment in which cross-module optimization is enabled, and in which:
  first source code is optimized in combination with second source code to obtain combined optimized object code, said first and second source codes each specifying intrinsics, said first source code specifying at least one library function, said second source code invoking a library function specified in said first source code.

55. The method of claim 54, in which said library function is selected from the group consisting of:
  (a) a math library function; and
  (b) a graphics library function.

56. The method of claim 47, in which the source code is written in a programming language selected from the group consisting of:
  (a) C;
  (b) C++; and
  (c) FORTRAN.

* * * * *